Sept. 26, 1950  V. J. TERRY ET AL  2,523,341
VIBRATING DEVICE
Filed Nov. 11, 1944
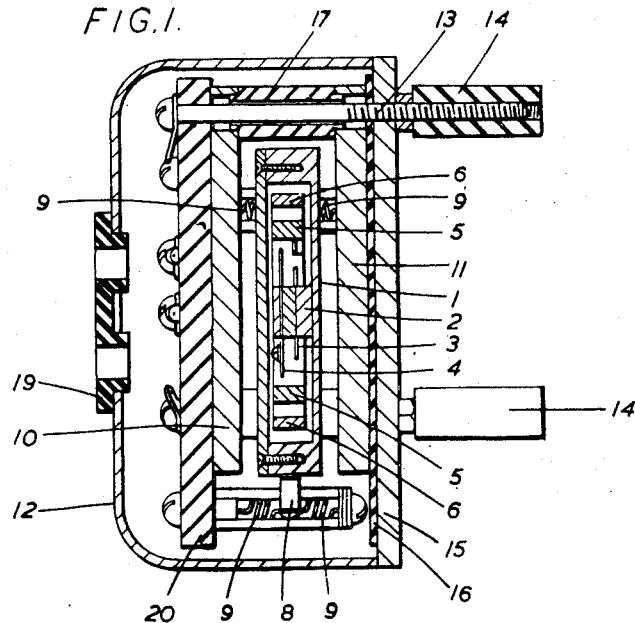
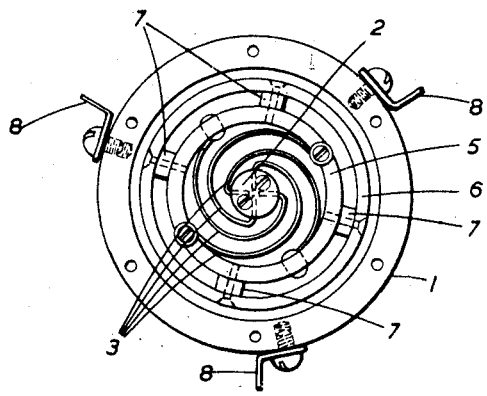
Inventor
Victor John Terry
Edward Archibald Foulkes
By
Robert T Harding Jr.
Attorney Patented Sept. 26, 1950

2,523,341

UNITED STATES PATENT OFFICE 2,523,341

VIBRATING DEVICE

Victor John Terry and Edward Archibald Foulkes, London, England, assignors, by mesne assignments, to International Standard Electric Corporation, New York, N. Y., a corporation of Delaware Application November 11, 1944, Serial No. 562,965
In Great Britain November 2, 1943

Section 1, Public Law 690, August 8, 1946
Patent expires November 2, 1963

9 Claims. (Cl. 175—41.5)

This invention relates to electrical devices for the detection or measurement of mechanical vibrations.

The object of the invention is to provide a device for converting mechanical vibrations into electrical variations, which device shall be independent of atmospheric conditions, usable in various physical positions, and not liable to disturbance from magnetic fields.

In accordance with this invention a device for the conversion of mechanical vibrations into electrical variations comprises a vibrating device of which the casing or frame is adapted to be subjected to the said vibrations and in which an element is provided that is suspended for relative movement with respect to said casing, possesses a large inertia so that it does not participate or at most only slightly in said vibrations. The movement of the suspended element generates electrical variations which may be indicated by suitable means and may be measured.

In accordance with a further feature of the invention a device for the conversion of mechanical vibrations into electrical variations comprises a casing adapted to be mounted upon the body subjected to said vibrations and to participate therein. The vibrations to which the casing is subjected are converted to electrical variations by electrical means which may be a pair of spaced plates rigidly mounted within said casing and also participating in said vibrations, and a second electrical means or element in the form of a plate of large mass suspended adjacent to the first electrical means for relative movement with respect thereto. The suspended plate is arranged intermediate said spaced plates so as to form electrical capacitances therewith and the relative movement towards and away from the spaced plates varies said capacitances in response to said vibrations.

Thus the present invention makes use of a vibrating device of the condenser type, rather than either of the other two common types namely carbon-granule type and magnetic type; the carbon-granule vibrator suffering from the disadvantages of being liable to disturbance by weather conditions and of being affected by its physical attitude, and the magnetic vibrator having the fault that it can never be really thoroughly well shielded from extraneous magnetic fields. Although a vibrator of the condenser type has deficiencies of its own, especially lack of sensitivity and limited frequency range, these can be dealt with comparatively easily so that for instance amplification can offset insensitivity and design for the job in hand can ensure use within the limited frequency range.

This question of the design of a vibrator to suit a certain frequency range and to give as broad a frequency range as may be, involves four considerations, namely, the fundamental natural frequencies of the suspended part, of the suspension, and of the rigid structure, and the damping of the moving part, especially at its fundamental frequency.

Considering the natural frequency of the suspended part, this is dependent solely on the deflection of the suspension under the influence of gravity acting on the suspended part, when positioned for vertical movement. This deflection has a direct bearing on the size of the gap between the suspended and rigid plates of the vibrating device. These gaps in their turn affect (a) the sensitivity, and (b) the change in sensitivity, with different physical positions, of the device. For general purposes, the natural frequency should be as low as possible in order to get a wider frequency range. This would necessitate as large a deflection as possible, and would require a large gap, whereas the sensitivity of the vibrating device requires as small a gap as possible. Also, if the change in sensitivity, with a change in physical position, is to be kept small, a large gap is required. Bearing these points in mind, applicants have found that the best arrangement is a push-pull system, i. e. the suspended electrical means or plate is centrally suspended between two other plates. These two plates, which will be called outer plates, should be rigidly fixed together but electrically insulated from one another, so that they may both be polarised. This push-pull arrangement gives an improved sensitivity and also tends to reduce the change in sensitivity with a change in the physical position of the device. From these considerations, the gap and the deflection can then be determined.

Considering next the damping of the suspended plate at the natural frequency, it is found advisable to flatten the response curve to avoid a resonance peak. One apparently obvious method of doing this is to make the suspension medium of rubber, which would act as a cushion and damp out the vibration in a short space of time. However, rubber is apt to collect frictional electrostatic charges, when subjected to compression, which would necessitate the suspension being electrostatically shielded. This is an unsatisfactory arrangement and, in addition, the rubber will perish in time. The suspension of the suspended plate will, therefore, preferably be by means of metal springs and the damping carried out by some arrangement attached to the central plate. A convenient arrangement consists of a mass suspended, on springs in air or oil, within the central plate, so that it is free to vibrate and absorb energy by fluid friction. For efficient damping, this mass should be at least 1/5 the mass which is to be damped (i. e. the suspended plate), and its natural period of vibration should be approximately the same as that of the mass to be damped. Air damping requires very small clearances, but sufficient damping can readily be obtained with reasonable clearances, by filling the space, in which the damping mass vibrates, with some kind of moderately viscous liquid such as transformer oil.

Considering thirdly the natural frequency of the suspension, and remembering that the vibrating device should preferably be capable of use in any position, then it will be seen that the central or movable plate, in accordance with this invention, should preferably be suspended from above and below by two opposed sets of springs having a slight initial tension to give lateral stability. The device might have to be used on any irregular curved surface, so that three legs would be a necessity and hence the central plate should also conveniently have three-point suspension. These considerations decide that there are to be six metal suspension springs, three above and three below the central plate so that each spring takes a sixth of the weight of the central plate. The central plate will most conveniently be suspended from its outer perimeter, so that the suspension springs would be in the most compact form if they were made of helical springs. The natural frequency of these springs, which limits the upper frequency range of the vibrating device, should be as high as possible. The ideal method of obtaining a suspension, with a high natural frequency, would consist of torsional springs acting through levers, of skeleton construction and light weight, in order to reduce as much as possible the movement of the mass of the springs. Failing this, helical stool springs in tension are to be preferred since the metal of such springs is in torsion and can store more energy for a given weight than a spring whose material is subjected to bending stresses.

Considering lastly the natural frequency of the fixed plates, this must be well outside the frequency range of the vibrator if it is not to impose its components in the working of the device. The two side plates should either be ribbed or made of thick metal and they should be rigidly fixed together and to the feet of the frame or casing. It is almost equally essential that no part of the cover-shields or the frame should have a resonant frequency within the working range of the instrument, because any such resonance will render the mechanical impedance of the whole structure so high that it will be difficult to make it follow the vibrations to be measured.

The invention will now be described with reference to the accompanying drawings, in which:

Fig. 1 shows a section of the instrument according to our invention; and

Fig. 2 shows a longitudinal section through the centre plate assembly.

The device shown in Figs. 1 and 2 and now to be described is a polarised push-pull condenser-type instrument, primarily designed for the analysis of the vibrations of a motor-generator running on ball-bearings at 3600 R. P. M., i. e. at 60 c./s. and carrying a centrifugal governor sensitive to vibrations below 2000 c./s.

As shown in the drawings, base plate 15 is covered on its upper surface by an insulating sheet 16 to separate it from the lower plate 11 of two outer brass plates. The upper plate 10 of the two outer plates is fixed on the underside of an insulating clamping block 20. Between the clamping block 20 and the base plate 15 extend three brass screws 13, passing without contact through enlarged holes in the two outer plates 10 and 11 and carrying spacing sleeves 17 of insulating material between the two outer plates so as to hold these two plates a fixed distance apart. The plates form a first electrical means which is electrically isolated and insulated from the parts forming the frame. Below the base plate 15 the screws 13 are fitted with insulating feet 14.

A central plate assembly 1 forms a second or suspended electrical means and lies substantially centrally between the two outer plates, being suspended by means of two opposed sets of three helical steel springs 9 that are attached to three legs 8 on the periphery of the plate assembly 1 and that have a slight initial tension to give lateral stability. This three-point suspension, with three springs above and three below, is the most suitable to enable the device to be used in any position.

The device is enclosed by a detachable mild steel casing 12, the leads to the electrical means of the device passing through holes in the casing lined by an eyelet 19 of insulating material. The use of mild steel for the casing provides an additional precaution against the influence of external magnetic fields.

Considering now more closely the details of the centre-plate assembly, it will be seen that this is provided with an internal damping mechanism for the purpose of reducing the excessive vibrations that are apt to occur as a resonance effect when the vibrations to be measured have a frequency approximating to that of the natural frequency of vibration of the centre plate. This damping mechanism consists of a weight in the form of two concentric brass rings 5 and 6 rigidly fixed together and suspended in an oil-filled cavity or chamber in the centre plate by four flat-spiral springs 3 of steel wire secured at their outer ends to the ring and at their inner ends to a central pillar 2 upstanding from the bottom of the cavity. This weight is then able to vibrate within the cavity, and its natural frequency of vibration is made the same as that of the centre plate. The oil filling consists most suitably of a fairly light type of oil, such as transformer oil (density approximately .9 gm./c. c.), and extends to about 90–95% of the cavity so as to allow for thermal expansion. Making the weight of two spaced rings instead of just one heavier ring has the advantage that it allows the oil to flow more freely between the upper and lower parts of the cavity.

The natural frequency of the central plate should be well below the lower end of the frequency range to be dealt with, if large corrections are to be avoided: on the other hand, too low a natural frequency involves the use of weak springs, large air gaps, and loss of sensitivity. In the actual model being described the natural frequency was about 25 c./s.

Thus, the electrostatic charge on the central plate is continuously varied, according to its position relative to the two outer plates. The rate of change of this charge produces a potential which on being amplified, serves as a means of examining the amplitude of vibration and composition, in regard to fundamental frequencies and harmonics, of a vibrating source. If the amplifier is used in conjunction with a suitable filter and oscillograph, the instrument may be used to measure the frequencies and relative magnitudes of all components present in the vibrating source.

As the vibrating device particularly shown is electrostatically operated, and there is practically no magnetic material on the suspended part, it is relatively unaffected by external magnetic fields.

The open circuit voltage generated by the electrical means is an E. M. F. proportional to displacement of the central plate relative to the outer plates and therefore proportional to the displacement of the object being measured, over the greater part of the working range of the instrument, seeing that the central plate remains almost unmoved at frequencies more than two or three times greater than its natural frequency.

What is claimed is:

1. A device for the conversion of vibrations into electrical variations comprising a frame, a first electrical means fixed to the frame, a second electrical means suspended adjacent the first electrical means for limited movement relatively thereto when the device is vibrated, the second electrical means having a completely enclosed chamber, and damping means carried within said chamber of the second electrical means including a spring suspended weight.

2. A device for the conversion of vibrations into electrical variations comprising a frame, a first electrical means carried by the frame, a second electrical means suspended adjacent the first electrical means for limited movement relatively thereto when the device is vibrated, the second electrical means having a completely enclosed chamber therein, and damping means carried within the chamber of the second electrical means including a spring suspended weight, and a fluid.

3. A device for the conversion of vibrations into electrical variations comprising a frame, a first electrical means secured to the frame, a second electrical means, and suspension means supporting the second electrical means adjacent to the first electrical means for limited movement relatively thereto including a plurality of spiral springs secured to the frame at their ends, and means carried by the second electrical means at the periphery thereof to secure the same to the springs at a point intermediate the ends thereof.

4. A device for the conversion of vibrations into electrical variations comprising a frame, a first electrical means secured to the frame, a second electrical means, and suspension means supporting the second electrical means adjacent the first electrical means for limited movement relatively thereto including a plurality of spiral springs secured to the frame at their ends and having a tension applied thereto, and means carried by the second electrical means at the periphery thereof to secure the same to the springs at a point intermediate the ends thereof.

5. A device for the conversion of vibrations into electrical variations comprising a frame, a first electrical means secured to the frame, a second electrical means, suspension means supporting the second electrical means adjacent to the first electrical means for limited movement relatively thereto, and damping means carried within a completely enclosed chamber of the second electrical means including a suspended weight having a natural frequency substantially the same as that of the second electrical means.

6. A device for the conversion of vibrations into electrical variations comprising a frame, a first electrical means secured to the frame, a second electrical means, suspension means supporting the second electrical means adjacent the first electrical means for limited movement relatively thereto, a completely enclosed chamber within the second electrical means, and damping means carried within the chamber including a suspended weight having a natural frequency substantially the same as that of the second electrical means, and a fluid within the chamber.

7. A device for the conversion of vibrations into electrical variations comprising a frame, a first electrical means secured to the frame, a second electrical means, and suspension means supporting the second electrical means adjacent the first electrical means for limited movement relatively thereto, a completely enclosed chamber within the second electrical means, and damping means carried within the chamber including a fluid within the chamber, and a weight within the chamber for movement therein, and the chamber and weight having passages for free flow of fluid within the chamber.

8. A device according to claim 6 wherein said weight comprises two concentric rings spaced apart.

9. A device according to claim 8 wherein said rings are resiliently attached to a stationary pillar fixed to an internal wall of said chamber.

VICTOR JOHN TERRY.
EDWARD ARCHIBALD FOULKES.

REFERENCES CITED

The following references are of record in the file of this patent:

UNITED STATES PATENTS

| Number | Name | Date |
|---|---|---|
| 1,746,171 | Vatinet et al. | Feb. 4, 1930 |
| 2,037,255 | Miller | Apr. 14, 1936 |
| 2,041,710 | Hayes | May 26, 1936 |
| 2,233,751 | Seeley | Mar. 4, 1941 |
| 2,257,187 | Owen | Sept. 30, 1941 |
| 2,288,838 | Pike et al. | July 7, 1942 |
| 2,305,267 | Minor et al. | Dec. 15, 1942 |
| 2,309,560 | Welty | Jan. 26, 1943 |
| 2,361,990 | Brown | Nov. 7, 1944 |